L. HAGOOD.
SYSTEM OF DISTRIBUTION.
APPLICATION FILED OCT. 3, 1912.
1,196,541.
Patented Aug. 29, 1916.
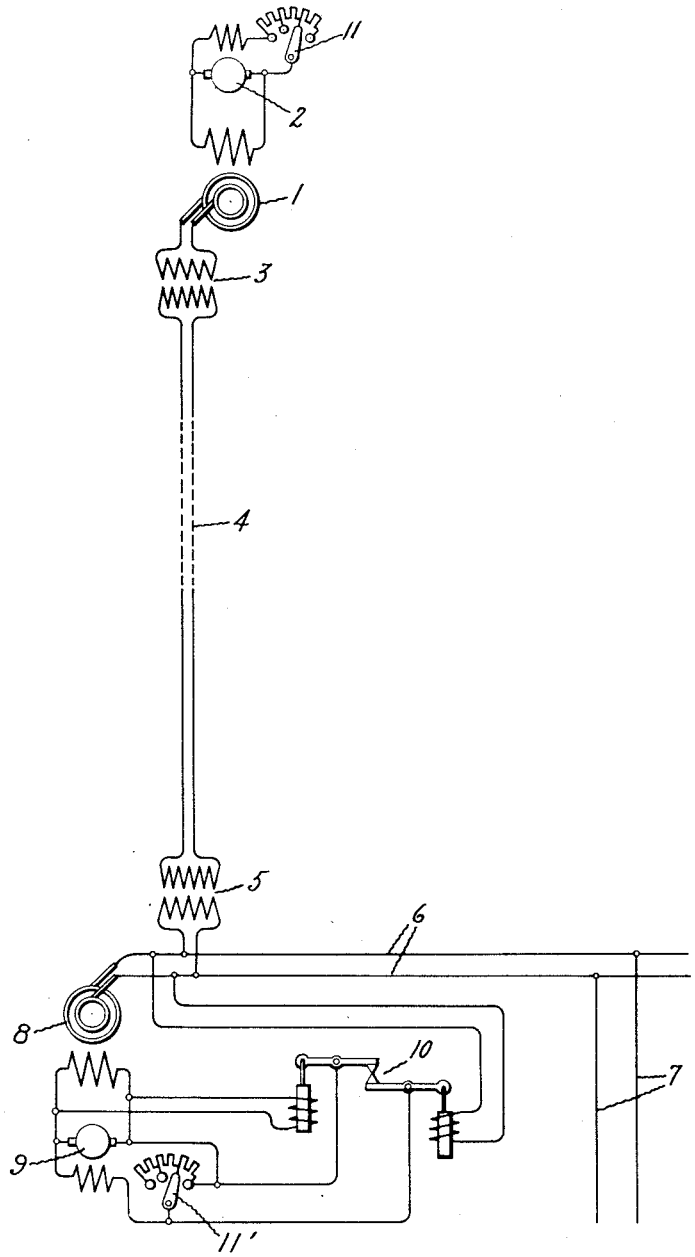
Witnesses.
Inventor
Lee Hagood
by
His Attorney

UNITED STATES PATENT OFFICE.

LEE HAGOOD, OF SCHENECTADY, NEW YORK, ASSIGNOR TO GENERAL ELECTRIC COMPANY, A CORPORATION OF NEW YORK.

SYSTEM OF DISTRIBUTION.

1,196,541. Specification of Letters Patent. Patented Aug. 29, 1916.

Application filed October 3, 1912. Serial No. 723,658.

*To all whom it may concern:*

Be it known that I, LEE HAGOOD, a citizen of the United States, residing at Schenectady, county of Schenectady, State of New York, have invented certain new and useful Improvements in Systems of Distribution, of which the following is a specification.

My invention relates to alternating current systems of distribution.

The object of my invention is to provide a novel method of operating certain of such systems.

My invention is particularly applicable to those alternating current systems of distribution utilizing a dynamo electric machine or machines at or near the receiving point of the system operating synchronously with the generator or generators. It has been recognized heretofore that such a synchronously operating machine, which is usually a motor, can be made to act, loaded or unloaded, either to supply wattless lagging current (inductance effect) or to supply wattless leading current (condenser effect) by properly exciting its field. It has also been recognized that the voltage at its point of connection to the system may be controlled by means of an automatic voltage regulator acting on its field. Now I have discovered the peculiar fact that, irrespective of the characteristics of the load if the voltage at the receiving station be maintained substantially equal to the generator voltage by suitably controlling the field of the synchronous machine, the system including the generator or generators, the transformers if any, and the transmission line up to the synchronous machine operate at all degrees of load at practically constant, and near unity, power factor. The advantages of this are many. The generators, transformers and transmission lines become available for delivering approximately the maximum amount of true power for the volt-ampere capacity of the apparatus, and at all loads the energy losses are approximately a minimum. Furthermore, I have discovered that if, after the two voltages have been adjusted by adjusting the field of either machine so as to make them equal for any particular operating condition, the synchronous machine is controlled by a voltage regulator in such a manner as to hold the voltage approximately constant at the receiving end of the line, then the voltage at the generating end of the line will be held approximately constant, the two will remain approximately equal at all loads, and that this will also result, as above described, in maintaining a practically constant power factor.

The single figure of the drawing illustrates diagrammatically part of a system of distribution involving my invention. At the generating end of the system is shown an alternator 1 and an exciter 2 exciting the field thereof. The apparatus at the generating end provides the energy to be transmitted over step-up transformer 3, the transmission line 4, and the step-down transformer 5 to the receiving station. At or near the receiving end of the line the step-down transformer 5 steps down the voltage from that of the transmission line to that desired at the bus bars 6; to these bus bars is connected the feeder line 7 supplying the load. To the bus bars 6 is also connected a synchronous machine 8, the field of which is supplied by the exciter 9. The voltage at the bus bars 6 may be maintained at any desired value within the limits of the apparatus by means of the ordinary Tirrill voltage regulator 10 in combination with an adjustable resistance 11' operating on the field of the exciter 9. Such an arrangement of apparatus was in common use prior to my invention, but the method of operation was essentially different from the method I propose to use.

My method consists broadly in holding the voltages at the receiving station and at the generating station substantially equal by means of the synchronous machine 8. The Tirrill regulator 10 is first so adjusted that the synchronous machine 8 holds the voltage at the bus bars 6 at the value desired. If necessary, the field excitation of the generator 1, or generators, is then so adjusted that the voltage impressed on the generating station bus bars is equal, or substantially equal, to the voltage at the terminals of the synchronous machine or machines 8. This adjustment of the voltage at the generating station may be made, for example, by means of the hand operated rheostat 11 in the field circuit of the exciter 2. Now with this relation of approximate equality of voltage between the generating and receiving ends of the transmission line once established, and the receiving voltage automatically held constant, the approximate equality will hold for all loads, and the power factor will remain practically constant.

The exact value of the power factor depends substantially upon the relation of the resistance to the reactance in the circuit between the points of equality in voltage. In general the larger the reactance relative to the resistance, the better will be the power factor. Under most operating conditions, the transmission line and transformers have sufficient inherent reactance to bring about a proper value of power factor; should this not be the case, however, sufficient additional reactance may be inserted.

It is to be understood that the prime movers must drive the generator or generators with the usual good speed regulation, and that the synchronous machine or machines 8 must be large enough to carry not only the wattless current of the load, but to supply such leading or lagging wattless current as may be required by the transmission circuit.

It has been assumed in the above detailed description that the step-up and step-down transformers have equal ratios of transformation. Wherever this is not the case the equality of voltages at the generating and receiving stations will not of course be a numerical equality; the proper equality to be sought in all cases is that of the generating and receiving bus bar voltages in terms of the high tension voltage of the transmission line, that is taking into consideration the transformer ratios.

What I claim as new and desire to secure by Letters Patent of the United States is:—

1. The method of operating an alternating current system of distribution, including a source of energy, a synchronously operating dynamo-electric machine, and a transmission line between the two, which consists in adjusting the field of the synchronous machine to make the voltage at the receiving end of the line equal to the generating voltage for any particular operating condition, and then regulating said field to hold the receiving voltage constant under varying load conditions, whereby the generating voltage and the power factor of the line are also maintained practically constant.

2. The method of operating an alternating current system of distribution, including a source of energy, a synchronously operating dynamo electric machine, and a transmission line between the two, which consists in automatically regulating the field of the synchronous machine to hold the voltage at its end of the transmission line at the desired value, and then manually adjusting the voltage of the source of energy until it equals the voltage at the synchronous machine for the then existing conditions, whereby the generating voltage, the receiving voltage, and the power factor of the line are maintained practically constant for all conditions of load.

In witness whereof, I have hereunto set my hand this first day of October, 1912.

LEE HAGOOD.

Witnesses:
BENJAMIN B. HULL,
HELEN ORFORD.